United States Patent [19]
Kurata et al.

[11] 3,929,963
[45] Dec. 30, 1975

[54] PROCESS FOR PREPARING CONCENTRATED TITANIUM MINERAL

[75] Inventors: Tokuzo Kurata; Satoshi Emi; Kunihiko Ofuchi; Tsutomu Takeuchi; Isamu Sone, all of Kitakyushu, Japan

[73] Assignee: Mitsubishi Chemical Industries, Ltd., Tokyo, Japan

[22] Filed: June 11, 1974

[21] Appl. No.: 478,274

[30] Foreign Application Priority Data
June 11, 1973  Japan................................ 48-65723

[52] U.S. Cl..................... 423/86; 423/74; 423/659; 75/101 R
[51] Int. Cl.².................... C01G 23/04; C22B 1/00
[58] Field of Search............. 423/86, 74, 659 F, 82, 423/610

[56] References Cited
UNITED STATES PATENTS

| | | |
|---|---|---|
| 1,885,187 | 11/1932 | De Rohden............................ 423/86 |
| 2,127,247 | 8/1938 | Dawson et al......................... 423/86 |
| 2,406,577 | 8/1946 | Alessandroni et al................ 423/86 |
| 2,912,320 | 11/1959 | Chang................................. 423/74 X |
| 3,627,508 | 12/1971 | Hughes et al........................ 423/86 X |

OTHER PUBLICATIONS

"Fluidization," by Donald F. Othmar, 1956 Ed., pp. 4 and 55, Reinhold Pub. Corp., N.Y.

*Primary Examiner*—Edward Stern
*Attorney, Agent, or Firm*—Oblon, Fisher, Spivak, McClelland & Maier

[57] ABSTRACT

A concentrated titanium mineral is prepared by leaching a reduced titanium mineral to remove iron components in a tower apparatus in the fluidized state with an acid leaching agent fed at a specific superficial linear velocity of $Ul \leq 0.004\ Dp + 0.15$ cm/sec.

6 Claims, 6 Drawing Figures

PROCESS FOR PREPARING CONCENTRATED TITANIUM MINERAL

BACKGROUND OF THE INVENTION

1. Field of the Invention

The present invention relates to a process for preparing concentrated titanium minerals. More particularly, the invention relates to an improved process for preparing concentrated titanium minerals by leaching a titanium mineral with an acid leaching agent to separate the iron components.

2. Description of Prior Art

Titanium minerals are useful as raw materials for titanium dioxide. Thus, the preferable raw materials are the concentrated titanium minerals having high titanium contents (for example containing more than 90% by weight of $TiO_2$) prepared by removing the iron components which are present in large amounts in the titanium minerals. Oxidative-thermal decomposition of titanium tetrachloride, prepared by chlorinating a concentrated titanium mineral in a fluidized bed, has been effectively used for the preparation of titanium dioxide from the concentrated titanium mineral. In this method, if the concentrated titanium mineral fed into the chlorination stage contains fine particles of the mineral, the fine particles will be carried along unreacted or incompletely reacted with the flow gas discharged from the reactor, resulting in loss of material, and transport difficulties such as pipe clogging. Accordingly, the fine particles are preferably omitted from the concentrated titanium mineral.

It is known that titanium minerals may be reduced and leached with acids such as hydrochloric acid, to separate the iron components and thus prepare concentrated titanium minerals. However, by conventional processes, it is difficult to prevent the formation of large amounts of fine particles, especially particles having diameters of less than $10\mu$. Therefore, this method is clearly undesirable. A need exists, therefore, for a method of concentrating titanium minerals by leaching, which will eliminate the formation of fine particles.

SUMMARY OF THE INVENTION

Accordingly, one object of the present invention is to provide a process for preparing a concentrated titanium mineral, containing few fine particles, from a titanium mineral.

These and other objects as well hereinafter become more readily understood by the following description can be attained by concentrating a titanium mineral by reduction and then leaching the product by contacting the mineral with an acid leaching agent to remove the iron components. The leaching treatment is carried out in the fluidized state with $50 - 300\mu$ average weight particle size (diameter) titanium mineral, and the superficial linear velocity (volumetric flow rate/sectional area of tower) of the leaching agent is given by the equation $U1 \leq 0.004 \, Dp + 0.15$ cm/sec, wherein Dp represents the average weight particle size ($\mu$) of the titanium mineral.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
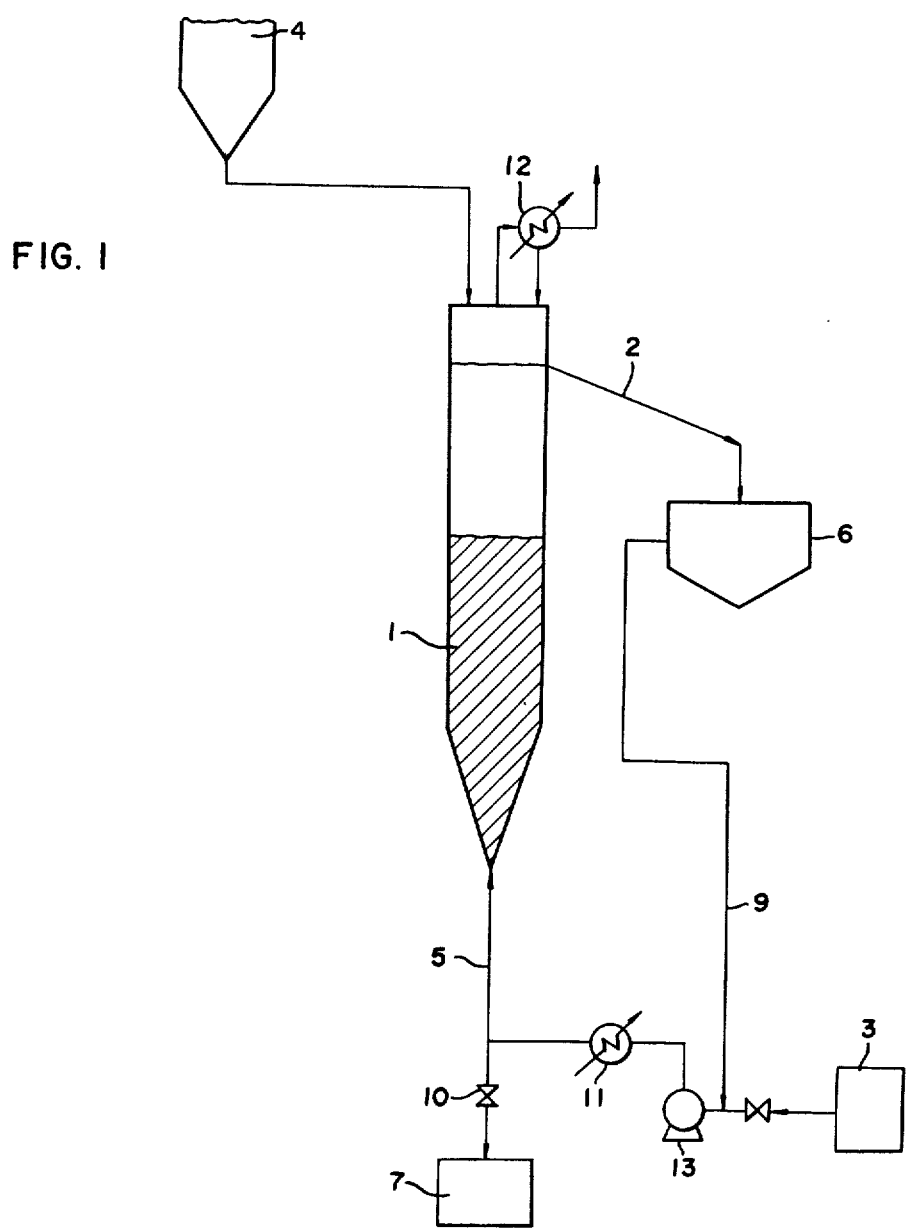
FIG. 1 is a flow diagram showing one embodiment of the batch leaching apparatus.

In the following examples, the terms "parts" and "%" indicate "parts by weight" and "% by weight", unless otherwise specified.

DETAILED DESCRIPTION OF THE PREFERRED EMBODIMENTS

In the process of the invention, suitable titanium minerals include ilmenite and other titanium minerals containing iron, chromium, silicate, or other minerals. Titanium minerals having diameter of $50 - 300\mu$ are preferable. The titanium mineral is first reduced to convert the iron components in the titanium mineral to ferrous compounds and then is contacted with an acid leaching agent. The oxidation of the iron components in the titanium mineral to ferric compounds before the reducing treatment, followed by the reducing and leaching treatments can lead to enhanced efficiency. The oxidizing treatment of the titanium mineral is usually performed by contacting the mineral with oxygen or an oxygen containing gas, such as air, at a temperature lower than the sintering temperature, preferably $800° - 1000°C$, for 30 minutes to 5 hours in a rotary kiln or fluidized bed reactor. The reducing treatment is usually performed by contacting the titanium mineral with a gaseous reducing agent, such as hydrogen, carbon monoxide, a hydrocarbon, a mixture of these, or a solid reducing agent, such as coke, coal, or the like, in the same reactor used for the oxidizing treatment.

The reducing treatment temperature is dependent upon the type of reducing agent and reducing time, and is usually $700° - 1000°C$, preferably $750° - 900°C$, for 30 minutes to 5 hours. In the reducing treatment, the iron components in the titanium mineral are reduced to ferrous compounds, but do not form substantial amounts of metallic iron. Thus, suitable leaching agents can include mineral acids, such as hydrochloric acid, sulfuric acid, etc. Hydrochloric acid is especially preferable as the leaching agent. The concentration of hydrochloric acid leaching agent is usually 10 - 36% by weight, preferably 15 - 30% by weight. The addition of a metal chloride, such as ferrous chloride, will facilitate the leaching treatment. When the metal chloride is added, the total chlorine ion concentration in the solution should be less than 36% by weight, and the free hydrochloric acid concentration more than 5% by weight, preferably more than 10% by weight.

It is preferable to add a chelating agent such as polyaminocarboxylic acids, polyaminocarboxylic amides, polyaminonitriles, polycarboxylic acids, oxycarboxylic acids, polycondensed phosphates, or the like; a sulfonate surfactant such as alkylbenzenesulfonates, alkylnaphthalene sulfonates, alkylsulfates, $\alpha$-sulfoaliphatic acid alkyl esters, succinic acid dialkyl ester sulfonates, amidosulfonates, or the like; high polymer coagulants, e.g. a nonionic, cationic or anionic polyacrylamide type coagulant, or the like to the acid leaching agent, to further inhibit the formation of fine particles. A polyacrylamide coagulant (composed mainly of polyacrylamide and having a molecular weight of several hundred thousand to several million; 1 – 80% usually 1 – 30%, of the acrylamide units can be modified), is most preferable to inhibit the formation of fine particles in leaching, and also to effectively inhibit the adhesion of scale on the leaching equipment.

Suitable additives include oxalic acid; tartaric acid, sodium nitrotripropionate; disodium ethylenediaminetetracetate; sodium dodecylbenzenesulfonate; phosphoric acid, anionic polyacrylamide, and the like. The amount of the additive employed is 0.001 – 5% by weight, preferably 0.001 – 1.0% by weight, of the titanium mineral. The additive can be impregnated onto the titanium mineral at the beginning.

The iron components of the titanium mineral can be leached and removed by contacting the titanium mineral with an acid leaching agent. The leaching treatment may be carried out in a batch system or in a continuous system, which may be multi-stage. It is especially preferable to apply the method in a continuous system, which can be operated co-currently or counter-currently. In the first stage of the multi-stage system, a counter current leaching process is preferably employed for passing the titanium mineral from the top to the bottom of the leaching tower and for passing the acid leaching agent from the bottom to the top of the leaching tower, so as to fluidize the titanium mineral in the leaching tower. This counter current leaching treatment is most preferably combined with a co-current leaching treatment in which the titanium mineral and the acid leaching agent are fed from the same side, whereby the apparent specific gravity of the concentrated titanium mineral particles can be made uniform. The number of leaching stages, including the counter current contact stages and the co-current contact stages is usually 2 – 5.

The average weight particle size of the titanium mineral fed to the fluidized bed leaching apparatus is 50 – 300μ, preferably 80 – 250μ, most preferable 120 – 200μ. A relatively high temperature is preferable in the leaching step, usually 80°C to the boiling point of the leaching agent, preferably 100°C to the boiling point of the leaching agent. The leaching time is dependent upon the particle size of the titanium mineral, the leaching temperature and the type of leaching agent, and is usually 3 – 50 hours.

When the leaching treatment is carried out by counter current and co-current leaching, the co-current leaching time is preferably more than twice the counter current leaching time. The fluidized state of the fluidized layer can be changed by adjusting the superficial linear velocity [volumetric flow/sectional area in empty tower (cm/sec.)]. The superficial linear velocity $U1$ is given by the following equation:
$$U1 \leq 0.004 Dp + 0.15, \text{ preferably } U1 \leq 0.002 Dp + 0.2,$$
wherein $U1$ represents the superficial linear velocity of the leaching agent (cm/sec.) and $Dp$ represents the average weight particle size of the titanium mineral ($\mu$). In a continuous system, if the superficial linear velocity of the leaching agent is higher than the above range, the formation of the fine particles cannot be inhibited to a desirable degree. The lower limit of the superficial linear velocity is usually $U1 \leq 0.000175 Dp - 0.008$, preferably $U1 \leq 0.000525 Dp - 0.024$ and most preferably $U1 \leq 0.000788 Dp - 0.036$ When the leaching treatment of the invention is carried out by the batch system, as shown in FIG. 1, the titanium mineral is fed to the top of the leaching tower 1 and the acid leaching agent is fed from the leaching agent feeding pipe 5 at the bottom of the tower through the heat exchanger 11 at the above specific superficial linear velocity to carry out a fluidized leaching treatment. Suitable leaching towers 1 include those having a conical bottom or having a suitable flow control plate. The acid leaching agent is discharged from the top of the tower through an overflow pipe 2 and the fine particles contained in the acid leaching agent are separated by a separator 6. The separator 6 may be a conventional filter, centrifugal separator, sedimentation separator, or the like. The acid leaching agent is recycled through pipe 9 to the leaching agent feeding pipe 5. It is possible to add a new acid leaching agent. After the acid leaching treatment is conducted for a suitable time, a valve 10 is opened to discharge the concentrated titanium mineral from pipe 5 into storage tank 7.

Figure 2:
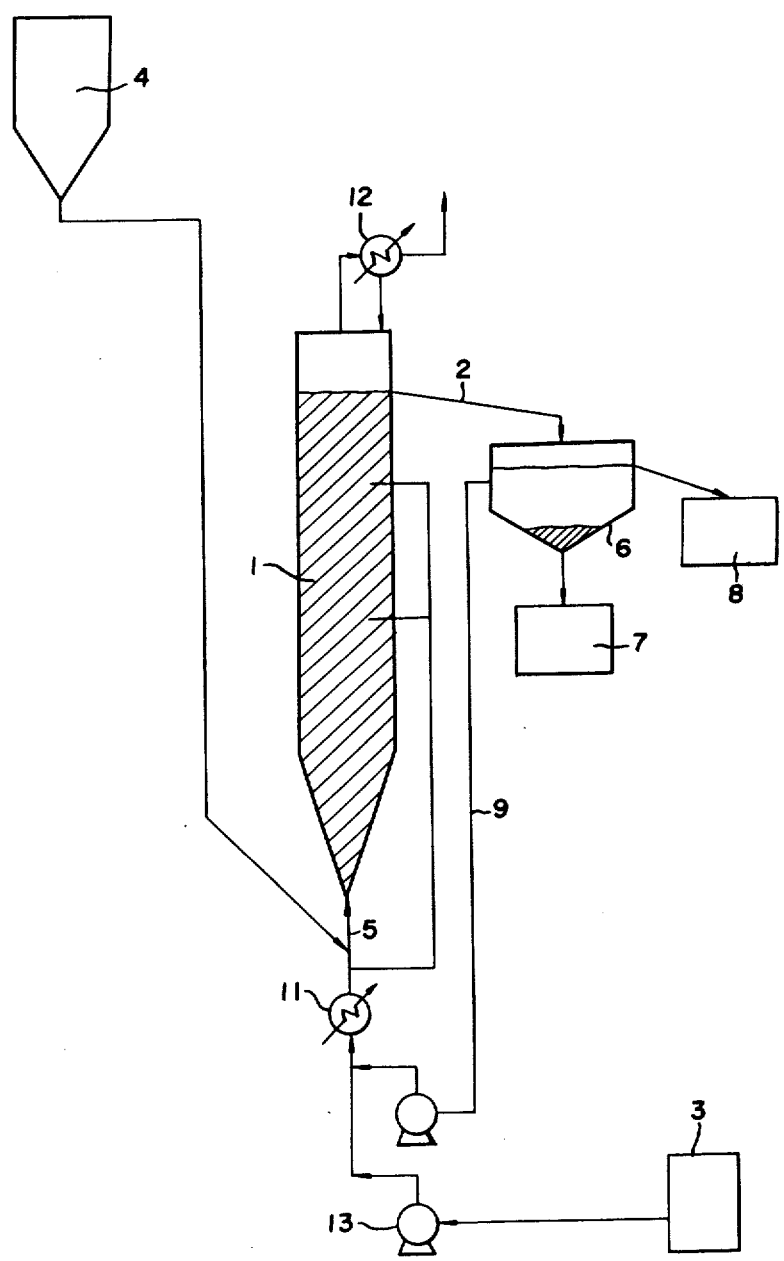
FIG. 2 is a flow diagram showing one embodiment of the continous leaching apparatus.

When the leaching treatment is carried out by a continuous system, as shown in FIG. 2, the acid leaching agent is fed from leaching agent storage tank 3 through pump 13 and heat exchanger 11 to the bottom of the leaching tower, which is similar to the batch system leaching tower, while maintaining the above desirable superficial linear velocity. The titanium mineral is fed from storage tank 4 through leaching agent feeding pipe 5 to the tower. The mixture of the acid leaching agent and the titanium mineral fed from the bottom of the tower rises and maintains a fluidized state, overflows via overflow pipe 2 at the top of the tower, and is fed to separator 6. In separator 6, the concentrated titanium mineral 7 is separated from the acid leaching agent 8. In the operation, a part of the separated acid leaching agent is recycled through pipe 9 by mixing the agent with new acid leaching agent. The vaporized acid leaching agent produced in the acid leaching treatment is condensed in condenser 12 and is recycled to the tower. A plurality of leaching towers may be connected in series.

The resulting concentrated titanium mineral is then washed, dried and calcined for use as a starting material for the preparation of titanium dioxide. The leaching treatment process of the invention is carried out with maintainance of the superficial linear velocity and the particle size of the titanium mineral in specific ranges whereby fine particles (having a particle diameter of less than 10μ) formed in the leaching treatment are controlled to less than 1% by weight of the total $TiO_2$ in the batch system and to less than 3% by weight of the total $TiO_2$ in the continuous system. Moveover, the content of $TiO_2$ in the concentrated titanium mineral is greater than 90% which is quite advantageous industrially.

Having generally described the invention, a further understanding can be attained by reference to certain specific examples which are provided herein for purposes of illustration only and are not intended to be limiting unless otherwise so specified.

EXAMPLE 1

A titanium mineral (ilmenite) composed of 54.3% of $TiO_2$, 23.7% of FeO and 16.9% of $Fe_2O_3$, which had an average weight particle size of $150\mu$ and which was obtained from Western Australia, was oxidized in the bed of a reactor fluidized with air which reactor was maintained at 950°C for 1 hour. The product was reduced in the fluidized bed reactor maintained at 850°C by introducing hydrogen gas containing 10% moisture for 30 minutes. The treated titanium mineral was cooled to room temperature in an inert gas, and the iron components in the treated mineral were analyzed. Of the total iron components 95.4% were in the form of ferrous compounds. The 20% hydrochloric acid leaching agent was fed to the batch leaching apparatus (fluidizing system) shown in FIG. 1, and was recycled by pump 13 at superficial linear velocities of 0.2, 0.4, 0.6 and 0.75 cm/sec. In reference experiments, the superficial linear velocities of 1.0 and 1.4 cm/sec were maintained at an apparatus temperature of 105°C. A 1 kg portion of the reduced titanium mineral was placed in the apparatus and the leaching treatment was carried out at 105° – 108°C for 5 hours. The amount of hydrochloric acid was stoichiometrically 1.4 times the iron content in the titanium mineral. After the leaching treatment, the amount of fine particles (less than 10 in particle size) contained in the leaching mixture was measured as percentage of total $TiO_2$. The concentrated titanium mineral was separated from the leaching mixture, washed with hydrochloric acid and water, dried and calcined. The resulting concentrated titanium mineral was analyzed. The results are shown in Table 1.

TABLE 1

| No. | Superficial linear velocity of leaching agent U1 (cm/sec) | Amount of fine particles formed (%) | Analysis of concentrated titanium mineral (%) $TiO_2$ | Fe |
|---|---|---|---|---|
| 1 | 0.2 | 0.30 | 96.0 | 0.8 |
| 2 | 0.4 | 0.42 | 96.3 | 0.7 |
| 3 | 0.6 | 0.65 | 96.4 | 0.7 |
| 4 | 0.75 | 0.98 | 96.2 | 0.6 |
| Reference | 1.0 | 2.0 | 96.1 | 0.6 |
| " | 1.4 | 3.2 | 96.5 | 0.5 |

EXAMPLE 2

The reduced titanium mineral of Example 1 was leached by employing a continuous leaching apparatus shown in FIG. 2. The 26% hydrochloric acid leaching agent was continuously fed from pipe 5 to leaching tower 1 at a rate of 227 parts per hour. The reduced titanium mineral in storage tank 4 was continuously fed via pipe 5 to leaching tower 1 at a rate of 100 parts per hour, together with the leaching agent. The leaching mixture was continuously fed via overflow pipe 2 to the solid-liquid separator 6. The separated liquid phase 8 was continuously discharged at a rate of 235 parts per hour. The separated solid phase including the concentrated titanium mineral (61 parts per hour) and the leaching agent (31 parts per hour) was continuously discharged to the concentrated titanium mineral storage tank 7. A part of the liquid phase was recycled through pipe 9 to leaching tower 1 at a superficial linear velocity of 0.2 cm/sec for the leaching agent. The temperature of leaching tower 1 was maintained at a temperature higher than 105°C by controlling the temperature of the leaching agent with heat exchanger 11. The residence time of the titanium mineral was about 5 hours. The amount of fine particles (less than $10\mu$ in particle size) contained in the concentrated titanium mineral as a percentage of total $TiO_2$ was measured. The solid phase separated by the leaching mixture was washed with hydrochloric acid and water, dried and calcined. The resulting concentrated titanium mineral was analyzed. The results are shown in Table 2. As a reference, the process of Example 2 was repeated except that the leaching was conducted at a superfical linear velocity of the leaching agent of 1 cm/sec for a residence time of about 4 hours. The amount of the fine particles based on total $TiO_2$ and the results of analysis of the concentrated titanium mineral are shown in Table 2.

TABLE 2

| No. | Superficial linear velocity of leaching agent U1 (cm/sec) | Amount of fine particles formed (%) | Analysis of concentrated titanium mineral (%) $TiO_2$ | Fe |
|---|---|---|---|---|
| Example 2 | 0.2 | 0.8 | 91.5 | 3.8 ($Fe_2O_3$ 5.4) |
| Reference | 1 | 8.6 | 88.7 | 5.6 ($Fe_2O_3$ 8.0) |

EXAMPLE 3

Figure 3:
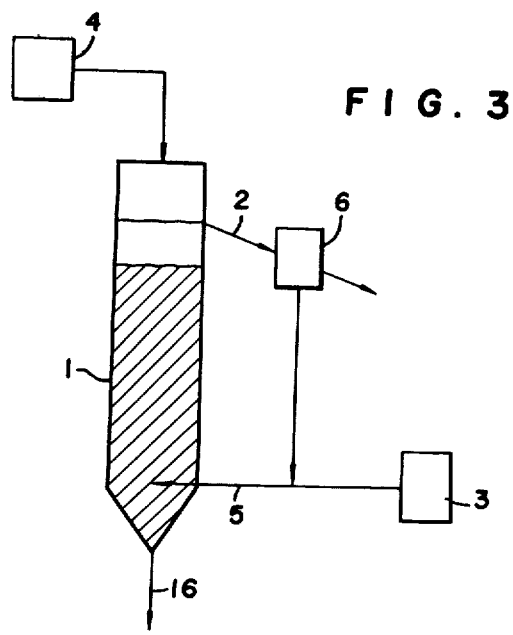
FIG. 3 is a flow diagram showing another embodiment of the continuous leaching apparatus.

The reduced titanium mineral of Example 1 was leached employing the continuous leaching apparatus shown in FIG. 3. The 26% hydrochloric acid leaching agent was continuously fed through pipe 5 to leaching tower 1 at a rate of 230 parts per hour. The reduced titanium mineral was continuously fed through pipe 2 to leaching tower 1 at a rate of 100 parts per hour. The acid leaching agent was continuously discharged from pipe 2 at a rate of 240 parts per hour. The solid phase containing the concentrated titanium mineral (61 parts per hour) and the leaching agent (31 parts per hour) was continuously discharged from pipe 16. A part of the leaching agent discharged was recycled through pipe 5 to leaching tower 1 at 0.2 cm/sec. superficial linear velocity of the leaching agent in leaching tower 1. The temperature of leaching tower 1 was maintained higher than 105°C in the leaching treatment. The residence time of the titanium mineral was about 5 hours. The amount of fine particles (less than $10\mu$ in particle size) contained in the leaching mixture discharged from pipes 2 and 16 based on total $TiO_2$ was 0.6 wt. %. The discharged solid phase was washed with water, dried at 120°C, and separated by sieving into three particle size groups shown in Table 3. The amount of iron components removed and the apparent specific gravity of the product in each particle size group were measured. The results are shown in Table 3. The solid phase was washed with water, dried and calcined to give the concentrated titanium mineral composed of 91.7 wt. % of TiO$_2$ and 3.7 wt. % of Fe.

TABLE 3

| Particle size ($\mu$) | Amount of iron component removed (%) | Apparent specific gravity |
| --- | --- | --- |
| 177 – 210 | 87.1 | 2.72 |
| 125 – 149 | 92.6 | 2.86 |
| 88 – 105 | 93.8 | 2.90 |

EXAMPLE 4

Figure 4:
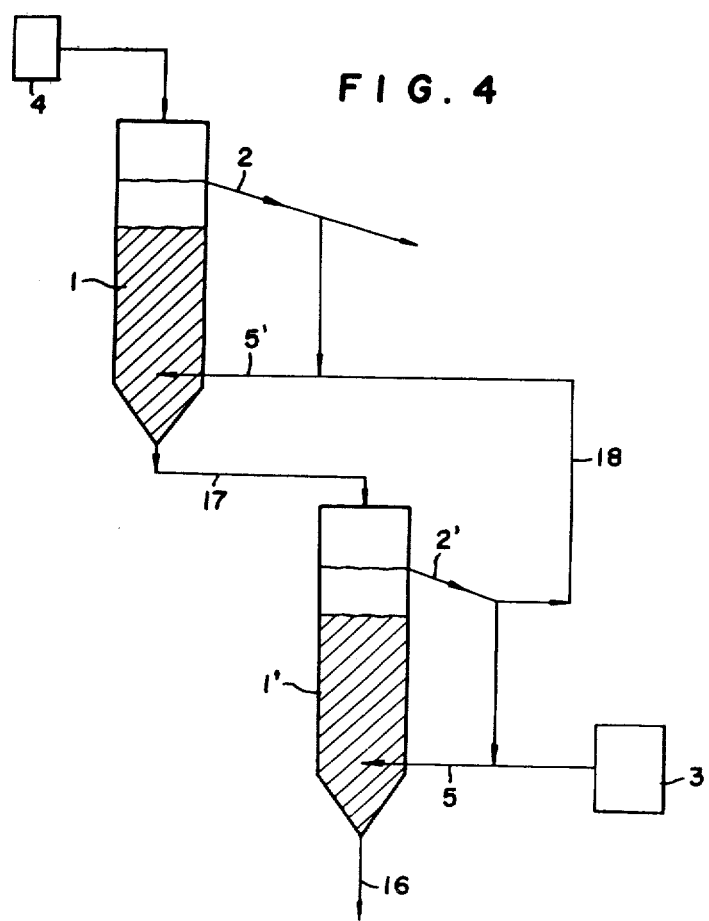
FIG. 4 is a flow diagram showing a further embodiment of the continuous leaching apparatus.

The reduced titanium mineral of Example 1 was continuously leached employing the leaching apparatus shown in FIG. 4. The 24% hydrochloric acid leaching agent was continuously fed from tank 3 through pipe 5 to the bottom of leaching tower 1' at a rate of 230 parts per hour. Simultaneously, a reduced titanium mineral was fed from tank 4 to the top of leaching tower 1 at a rate of 100 parts per hour. The reduced titanium mineral was countercurrently contacted with the acid leaching agent fed from pipe 5' at the bottom of the tower and was continuously discharged from pipe 17. The discharged solid was fed to the top of the second leaching tower 1'. Simultaneously, the acid leaching agent was continuously discharged via overflow pipe 2. A part of the leaching agent was recycled through pipe 5' to the leaching tower 1 at 0.2 cm/sec. superficial linear velocity of the acid leaching agent in the leaching tower 1. The residue was discharged via pipe 4 from the system at a rate of about 228 parts per hour. The temperature of the leaching tower 1 was maintained at about 105°C in the leaching treatment. The average residence time of the titanium mineral in the first leaching tower was about 4 hours. Similarly, the titanium mineral fed to the second leaching tower 1' was counter-currently contacted with the acid leaching agent fed from pipe 5 and was continuously discharged from pipe 16 as concentrated titanium mineral (62 parts per hour) including the acid leaching agent (40 parts per hour) by gravity. Simultaneously, the acid leaching agent was continuously discharged via overflow pipe 2'. A part of the discharged leaching agent was continuously recycled through pipe 5 to the leaching tower 1' at 0.2 cm/sec superficial linear velocity of the acid leaching agent in the second leaching tower 1'. The residue was fed through pipe 18 to leaching tower 1. The temperature of the leaching tower 1' was maintained at about 105°C in the leaching treatment. The average residence time of the titanium mineral in the second leaching tower was about 3 hours. The solid phase discharged from pipe 16 was washed with water, dried at 120°C and separated by sieving into three particle size groups shown in Table 4. The amount of iron components removed and the apparent specific gravity of the product in each particle size group were measured. The results are shown in Table 4. The solid phase was washed with water, dried and calcined to give the concentrated titanium mineral composed of 92.7 wt. % of TiO$_2$ and 3.3 wt. % of Fe. The amount of fine particles (less than 10$\mu$ in particle size) contained in the leaching mixture discharged from pipes 2 and 16 based on total TiO$_2$ was 0.7%.

TABLE 4

| Particle size ($\mu$) | Amount of iron content removed (%) | Apparent specific gravity |
| --- | --- | --- |
| 177 – 210 | 86.7 | 2.70 |
| 125 – 149 | 92.5 | 2.87 |
| 88 – 105 | 94.3 | 2.91 |

EXAMPLE 5

Figure 5:
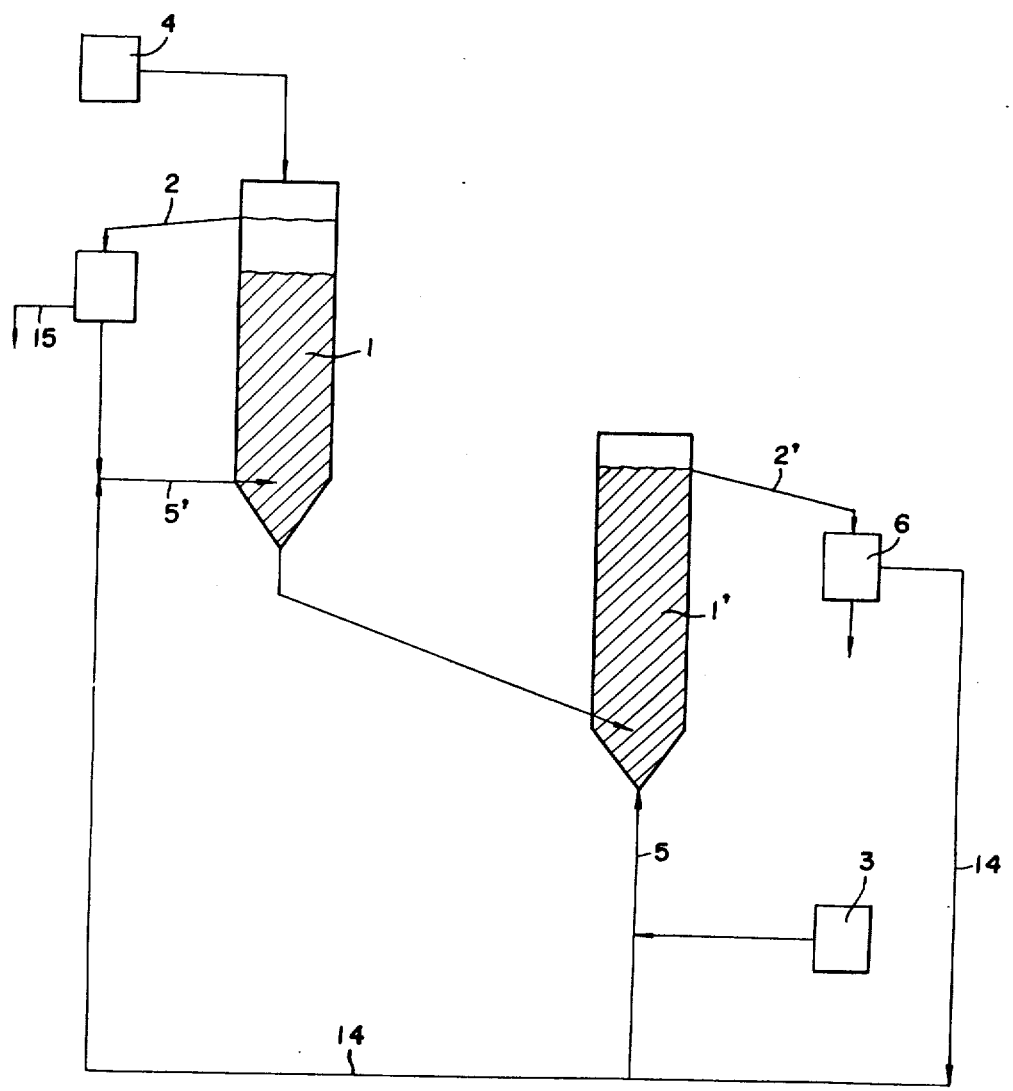
FIG. 5 is a flow diagram showing yet another other embodiment of the continuous leaching apparatus and FIG. 6 is a flow diagram showing still another embodiment of the continuous leaching apparatus, according to the invention.

The reduced titanium mineral of Example 1 was leached employing the continuous leaching apparatus shown in FIG. 5. The 24% hydrochloric acid leaching agent was continuously fed from tank 3 through pipe 5 to the second leaching tower 1' at a rate of 230 parts per hour. The acid leaching agent was discharged from the pipe 2' and was fed through pipes 14 and 5' to the first leaching tower. Simultaneously, the reduced titanium mineral was fed from tank 4 to the top of the first leaching tower 1 at a rate of 100 parts per hour. The titanium mineral was contacted with the acid leaching agent in the tower in the fluidized state and was discharged from the bottom of the first leaching tower. The treated titanium mineral discharged from the first leaching tower was fed to the bottom of the second leaching tower 1', rose in the fluidized state together with the acid leaching agent fed from the pipe 5 in the tower, and the mixture was discharged from the top of the tower. The leaching mixture discharged was fed to the separator 6 wherein the concentrated titanium mineral was separated at a rate of 62 parts per hour from the acid leaching agent. A part of the acid leaching agent was recycled through pipe 14 and the pipe 5' to the bottom of the first leaching tower and the other part of the acid leaching agent was fed through pipe 5 to the second leaching tower. The superficial linear velocity in each tower was controlled to 0.2 cm/sec. A part of the acid leaching agent was discharged from pipe 15 and out of the system at a rate of about 228 parts per hour. The temperature of each of the leaching towers was maintained at about 105°C in the leaching treatment. The residence time of the titanium mineral was about 4 hours in the first leaching tower and about 3 hours in the second leaching tower. The resulting concentrated titanium mineral was washed with water, dried at 120°C, and separated into three particle size groups. The amount of iron components removed and the apparent specific gravity of the product in each particle size group was measured. The results are shown in Table 5. The amount of fine particles (less than 10$\mu$ in particle size) contained in the leaching mixture based on total TiO$_2$ was 0.85 wt. %. The concentrated titanium mineral contained 93.2 wt. % of TiO$_2$ and 2.8 wt. % of Fe.

TABLE 5

| Particle size ($\mu$) | Amount of iron component removed (%) | Apparent specific gravity |
| --- | --- | --- |
| 177 – 210 | 95.0 | 2.86 |
| 125 – 149 | 94.2 | 2.81 |
| 88 – 105 | 89.3 | 2.76 |

EXAMPLE 6

Figure 6:
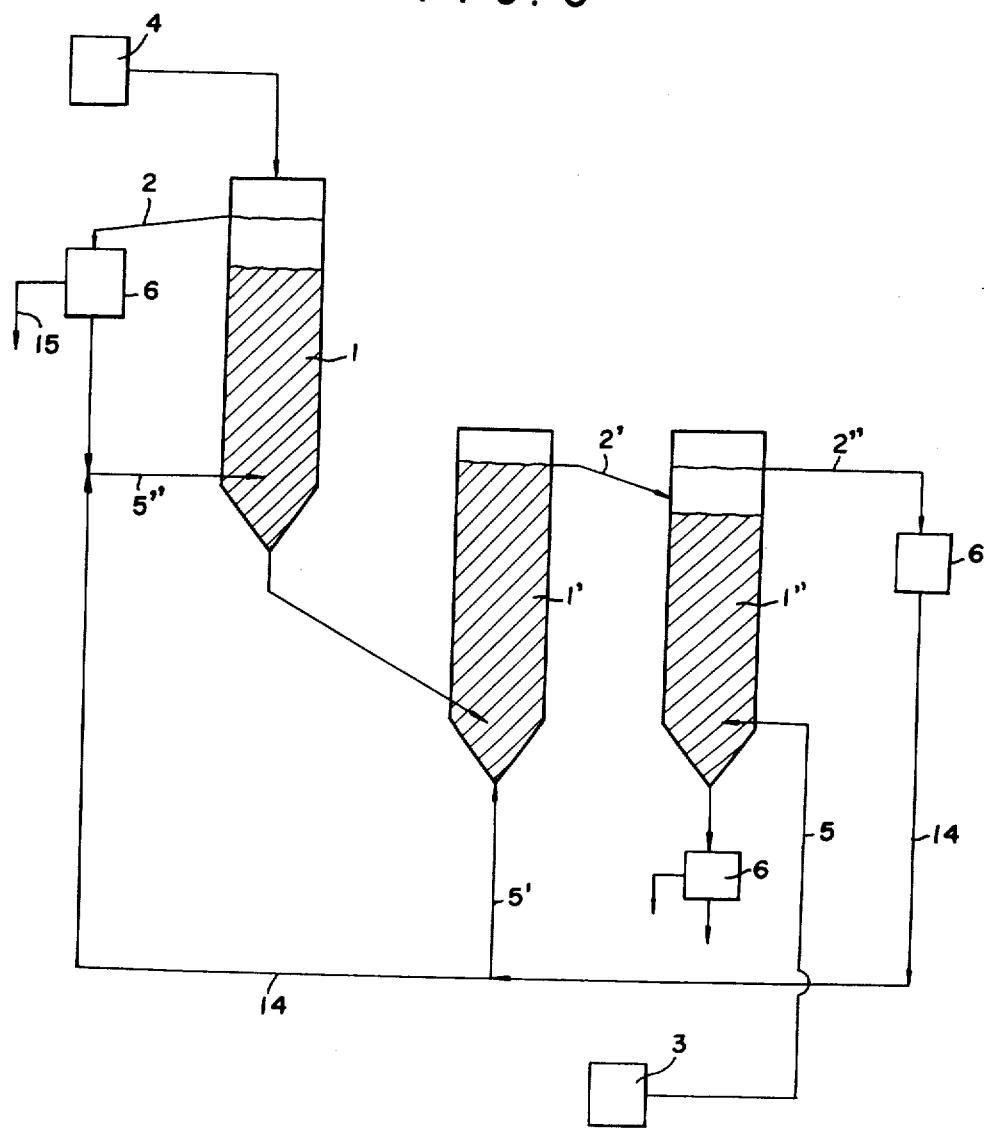

The reduced titanium mineral of Example 1 was continuously leached employing the leaching apparatus shown in FIG. 6. The 24 wt. % hydrochloric acid leaching agent was continuously fed from tank 3 through pipe 5 to the third leaching tower 1'' at a rate of 250 parts per hour. The acid leaching agent was discharged from the top of the tower and was fed via pipes 2'' and 14 and through pipe 5'' to the bottom of the first leaching tower 1 and through pipe 5' to the bottom of the second leaching tower 1'. Simultaneously, the titanium mineral was fed from tank 4 to the first leaching tower 1 at a rate of 100 parts per hour. The titanium mineral fed into the first leaching tower was contacted with the acid leaching agent in the fluidized state and was discharged from the bottom of the tower. The treated titanium mineral was fed into the bottom of the second leaching tower 1', rose in the fluidized state together with the acid leaching agent fed from pipe 5' in the tower, and the mixture was discharged via pipe 2' at the top of the tower. The leaching mixture discharged was fed to the top of the third leaching tower 1'', was counter-currently contacted with the acid leaching agent fed from the bottom of the tower and settled in the tower, whereby the concentrated titanium mineral was discharged from the bottom of tower at a rate of 60 parts per hour. A part of the acid leaching agent discharged from pipe 2'' was recycled through pipes 5'' to the bottom of the first leaching tower and through pipe 5' to the bottom of the second leaching tower. The superficial linear velocity in each tower was controlled to 0.2 cm/sec.

A 0.1% aqueous solution of anionic polyacrylamide was fed through each of the pipes 2 and 2'' at a rate of 12 parts per hour. The temperature of each of the leaching towers was maintained at about 105°C in the leaching treatment. The residence time of the titanium mineral was about 4 hours in the first leaching tower, about 3 hours in the second leaching tower and about 2 hours in the third leaching tower. The concentrated titanium mineral treated by the leaching treatment was washed with water, dried at 120°C, and separated into three particle size groups. The amount of iron components removed and the apparent specific gravity of the product in each particle size group were measured. The results are shown in Table 6. The amount of fine particles (less than 10$\mu$ in particle size) contained in the leaching mixture based on total $TiO_2$ was 0.4 wt. %. The concentrated titanium mineral contained 95.0 wt. % $TiO_2$ and 1.5 wt % Fe.

TABLE 6

| Particle size ($\mu$) | Amount of iron component removed (%) | Apparent specific gravity |
|---|---|---|
| 177 – 210 | 96.9 | 2.90 |
| 125 – 149 | 97.1 | 2.89 |
| 88 – 105 | 95.4 | 2.84 |

Having now fully described the invention, it will be apparent to one of ordinary skill in the art that many changes and modifications can be made thereto without departing from the spirit or scope of the invention as set forth herein.

What is claimed as new and desired to be secured by Letters Patent is:

1. In a process for preparing a concentrated titanium mineral by reducing a titanium mineral with a reducing agent such that the iron components of the minerals are substantially reduced to the $Fe^{+2}$ state, and thereafter leaching the reduced titanium mineral with an acid leaching agent which minimizes the formation of fine particulate material of a particle size diameter less than 10$\mu$, the improvement which comprises:

leaching a reduced titanium mineral at a temperature from 80°C to the boiling point of the leaching agent by feeding said reduced titanium mineral having an average weight particle size of 50 – 300$\mu$, and by feeding the acid leaching agent at a superficial linear velocity (volumetric flow rate/sectional area of tower) of $U1 \leq 0.004\ Dp + 0.15$ cm/sec, wherein U1 represents the superficial linear velocity of the acid leaching agent and Dp represents the average weight particle size ($\mu$) of the titanium mineral into a tower leaching apparatus under fluidized conditions.

2. The process of claim 1 wherein the titanium material is ilmenite.

3. The process of claim 1 wherein the acid leaching agent is hydrochloric acid having a concentration greater than 5%.

4. The process of claim 1 wherein the leaching treatment is carried out in a continuous manner.

5. The process of claim 1 wherein the leaching treatment is conducted by continuous counter-current contact of the titanium mineral passing from the top to the bottom of the leaching tower with the acid leaching agent passing from the bottom to the top of the leaching tower.

6. The process of claim 5 wherein the leaching treatment is conducted in a continuous multi-stage manner by counter-currently contacting said titanium mineral continuously flowing from top to bottom of a first tower with said leaching agent continuously flowing from the bottom to top of said first tower in at least one stage, and by cocurrently contacting said titanium mineral with said leaching agent both flowing from bottom to top of a second tower in at least one stage.

* * * * *